L. F. Shaw,
Imitation Human Hair.
No. 4,031. Reissued June 14. 1870.
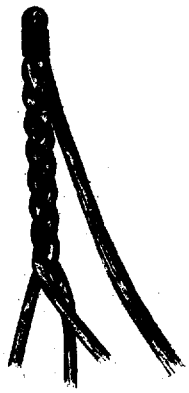
Lyman F. Shaw
Witnesses
for Lemuel W. Serrell atty.
Chas. H. Smith
Geo. A. Wacker
N. PETERS, PHOTO-LITHOGRAPHER, WASHINGTON, D. C.

United States Patent Office.

LOUISE F. SHAW, OF NEW YORK, N. Y.

*Letters Patent No.* 96,275, *dated October* 26, 1869; *reissue No.* 4,031, *dated June* 14, 1870.

IMITATION-HAIR FOR LADIES' HEAD-DRESS.

The Schedule referred to in these Letters Patent and making part of the same.

*To all whom it may concern:*

Be it known that I, LOUISE F. SHAW, of the city and State of New York, have invented, made, and applied to use a new and useful Improvement in Imitation Human Hair; and I do hereby declare the following to be a full, clear, and exact description thereof, and of the features that distinguish the same from other devices that have preceded it.

I have represented, in the accompanying drawing, a portion of a braid of this imitation-hair, as illustrative of my invention.

It is well known that the trade in human hair is enormous, and that the high price that the same commands has induced unscrupulous persons to resort to measures for obtaining the same that are detrimental to public health and morals.

In many instances the hair is cut off the heads of the most loathsome and degraded women, and, notwithstanding the vermin and eggs of the same, is cured and worked up into "curls" "switches," "braids," and other head-ornaments, for the most wealthy and refined; and, furthermore, it is well known to the trade that large quantities of hair are constantly put into the market that have been taken from the bodies of dead persons, that have been disinterred simply to obtain the hair; and this fact is frequently demonstrated from the roots of the hair remaining upon them as they have been pulled out of the putrid, decaying flesh of the dead. The hair obtained in this manner is always diseased, and no subsequent curing can make the hair as good as that cut from a living person, and diseases of the hair and scalp are frequently the result of wearing the false hair obtained as aforesaid.

In order to form an imitation-hair that could be worn as a head-ornament by persons not having sufficient natural hair, grasses and silk have been employed. The grasses, however, are not adapted to use, because they cannot be combed, brushed, curled, or plaited similarly to the human hair; therefore, these materials, when once made up, have to remain in that form; and, so far as the use of silk, the same is expensive, the single threads are too fine to imitate human hair, and in any other form they cannot be combed or brushed, because they become entangled; hence, the only forms in which silk could be applied have been as a woven net or surface to a grass or other braid or plait, or else in a crimped or wavy form that does not resemble human hair.

To overcome the objectionable features hereinbefore enumerated is the object of this invention; and the same consists in the employment of fine glazed threads, prepared, as hereafter set forth, in imitation of human hair, the same being so glazed and prepared as to be capable of being combed, brushed, twisted, or braided, as an imitation human hair for a head-dress. These threads, being entirely free from odor, and from any objectionable or detrimental properties, can be employed with perfect safety, and the expense is comparatively small.

The thread employed by me is prepared in the following manner:

A fine, strong thread is selected, similar to sewing-thread or cotton. (I prefer and use the cotton thread.) It is dyed of the required color, and, while in the hank, or singly, the thread is subjected to the glazing operation, consisting of singing off the projecting fibers, sizing, brushing, stretching, and drying, so that the thread is brought to a smooth, glossy surface, and the tendency to twist and become entangled entirely done away with.

The thread prepared in this manner is formed into hanks or switches of the desired length by braiding the same together, or "weaving" it at the one end of said "switch," so as to firmly unite the threads together. The threads may be still further prepared by a small quantity of glycerine or other material, to make them pliable and resemble human hair.

The switches or lengths made in this manner are easily combed or brushed, and braided, or otherwise prepared as a head-dress, and form a good imitation of human hair, that is both cheap and easily varied from time to time in the style of putting up, similarly to the human hair.

I claim as my invention—

The imitation human hair, made of glazed threads united together at one end, and adapted to use as a head-dress, substantially as specified.

Dated March 22, A. D. 1870.

LOUISE F. SHAW.

Witnesses:

CHAS. H. SMITH,

GEO. T. PINCKNEY.